No. 890,107. PATENTED JUNE 9, 1908.
B. VAN DECAR.
POWER TRANSMISSION MECHANISM.
APPLICATION FILED JUNE 25, 1906.
4 SHEETS—SHEET 1.
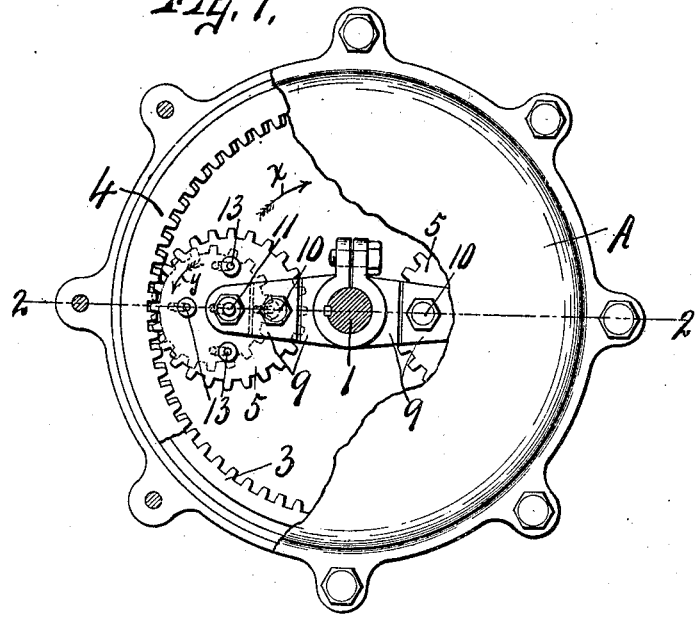
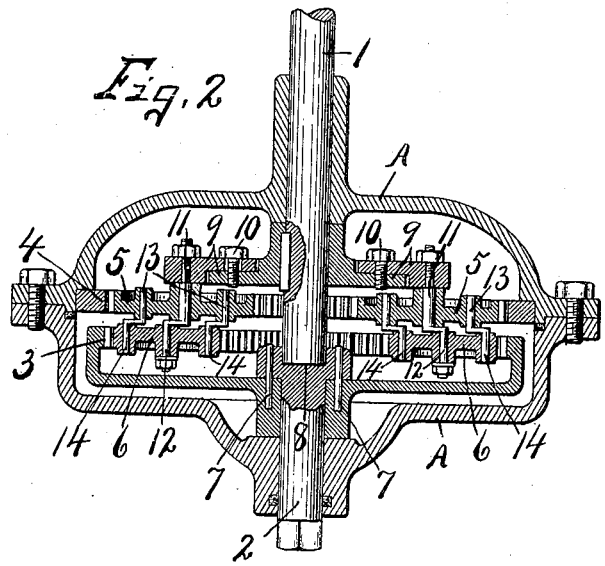
WITNESSES:
INVENTOR:
B. Van Decar
BY:
Howard P. Denison
ATTORNEY.

No. 890,107.

PATENTED JUNE 9, 1908.

B. VAN DECAR.
POWER TRANSMISSION MECHANISM.
APPLICATION FILED JUNE 25, 1906.

4 SHEETS—SHEET 2.

WITNESSES:

INVENTOR:
B. Van Decar
BY:
Howard P. Denison
ATTORNEY:

No. 890,107. PATENTED JUNE 9, 1908.
B. VAN DECAR.
POWER TRANSMISSION MECHANISM.
APPLICATION FILED JUNE 25, 1906.

4 SHEETS—SHEET 3.

WITNESSES:
INVENTOR:
B. Van Decar
BY:
Howard P. Denison
ATTORNEY:

No. 890,107. PATENTED JUNE 9, 1908.
B. VAN DECAR.
POWER TRANSMISSION MECHANISM.
APPLICATION FILED JUNE 25, 1906.
4 SHEETS—SHEET 4.
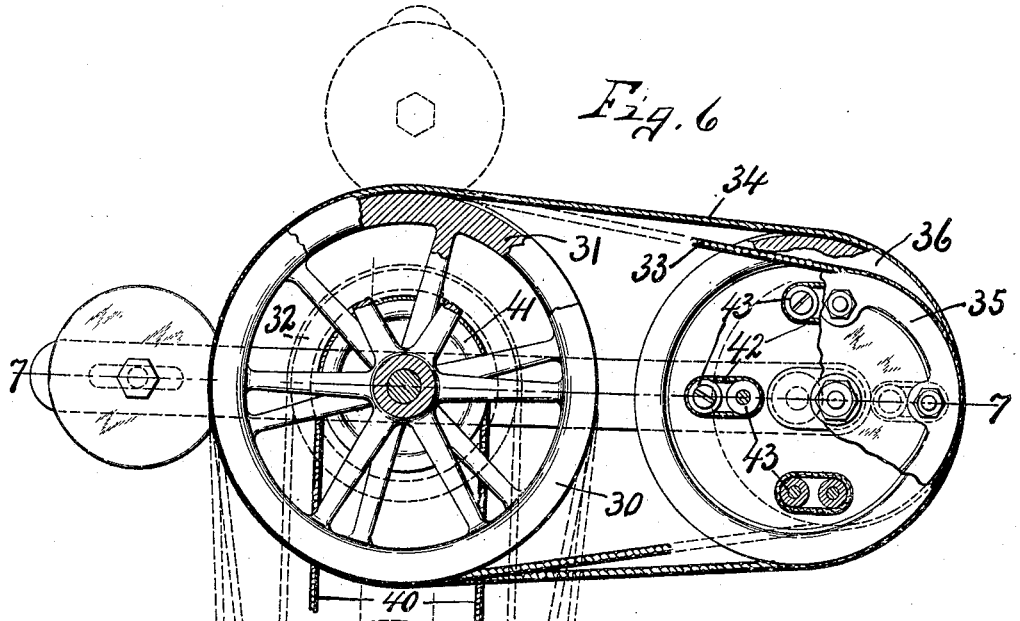
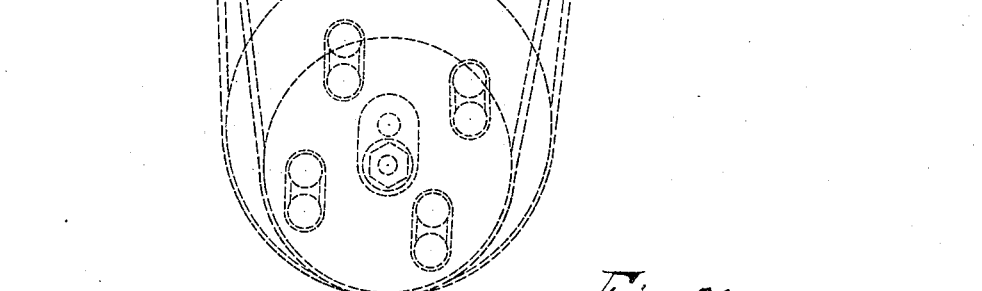
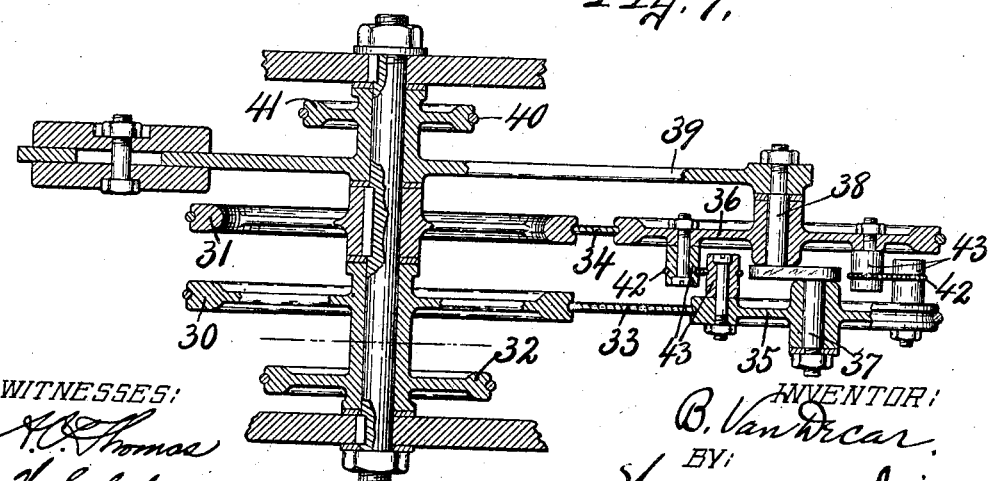

UNITED STATES PATENT OFFICE.

BENNETT VAN DECAR, OF SYRACUSE, NEW YORK.

POWER-TRANSMISSION MECHANISM.

No. 890,107.  Specification of Letters Patent.  Patented June 9, 1908.

Application filed June 25, 1906. Serial No. 323,290.

*To all whom it may concern:*

Be it known that I, BENNETT VAN DECAR, of Syracuse, in the county of Onondaga, in the State of New York, have invented new and useful Improvements in Power-Transmission Mechanism, of which the following, taken in connection with the accompanying drawings, is a full, clear, and exact description.

This invention relates to certain improvements in power transmitting mechanism involving the use of two epicyclic trains or planetary actions in which the epicyclic or planet wheels revolve about the same axis, but in different concentric deferents, or in which the radii vectors are of different lengths.

My object is to provide a simple high power transmission device capable of automatically locking itself in any of its adjusted positions against retrograde movement or counter-action by the load upon the driven element, and is particularly adapted for hoisting, feeding, and conveying heavy loads, and for operating high pressure devices, such as presses, vises, lifting-jacks, the steering mechanism for self-propelled vehicles, and analogous devices in which it may be desired to lock the element operated upon in any of its adjusted positions.

The principle of this invention involves the use of a fixed annulus; a rotary driving element concentric with the axis of the fixed annulus and carrying a planetary element deriving rotary motion from its connection with the fixed annulus and imparting rotary motion to a second planetary element through the medium of eccentric connections with the first planetary element, and a driven annulus mounted on the same axis with the fixed annulus and driving element, and deriving motion from the second planetary element.

Figure 3:
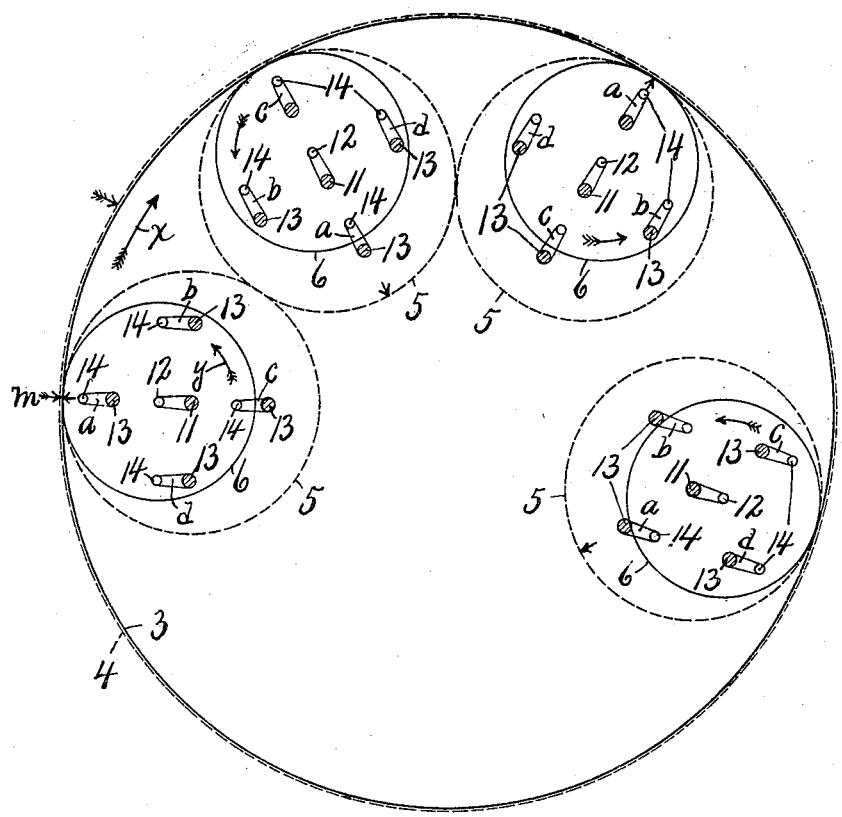
Figure 4:
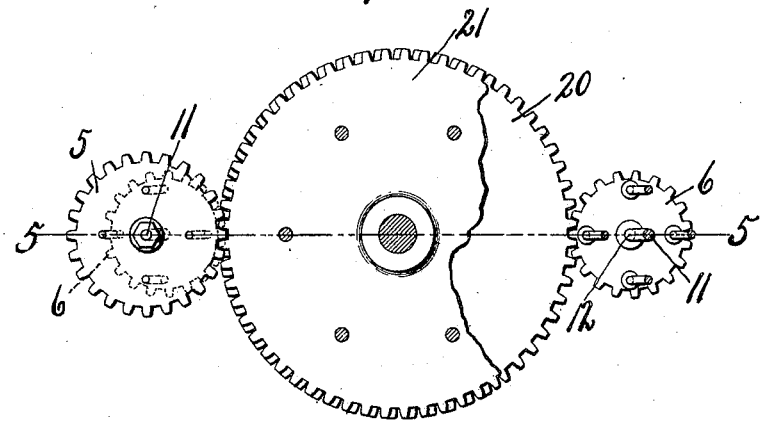
Figure 5:
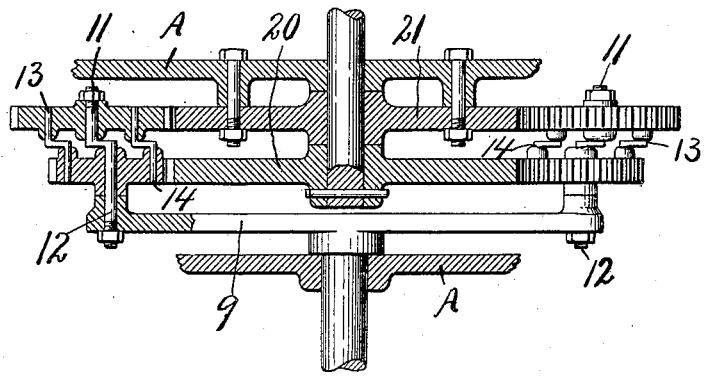

In the drawings—Figure 1 is a top plan, partly broken away, of one form of my improved power transmitting mechanism in which the internal gears are employed in connection with the planetary elements. Fig. 2 is a sectional view taken on line 2—2, Fig. 1. Fig. 3 is a diagrammatic view of the device seen in Figs. 1 and 2, showing the planet wheels in different positions in the deferent. Fig. 4 is a top plan, partly in section, of a modified form of my invention in which spur gearing is employed in connection with the planetary gears. Fig. 5 is a sectional view taken on line 5—5, Fig. 4. Fig. 6 is a side elevation of a further modified form of my invention, in which the belts are employed as a means of transmission of power between the rotary elements and fixed element. Fig. 7 is a sectional view taken on line 7—7—, Fig. 6.

In all of the above described modifications the invention is characterized by connecting the planet wheels for simultaneous rotation upon their respective axes which are parallel, but travel in different concentric orbits at different distances from the center or axis of the deferent, rotary motion being imparted to one of the planet wheels during its orbital movement through its connection with a fixed annulus, while the other planet wheel imparts rotary motion to a revoluble driven element on the same axis as the fixed annulus.

Another distinguishing characteristic of all of these devices is that the relation of the radii vectors of both planet wheels remains constant through each orbital cycle of operation.

The device shown in Figs. 1 to 3 inclusive makes use of a driving element as a shaft —1—; a driven element, as a shaft 2— having secured thereto an internal gear— 3— to which rotary motion is imparted from the driving element —1— through the medium of a fixed internal gear —4— and planetary gears —5— and —6— meshing respectively with the fixed gear —4— and revoluble driven gear —3—.

The driving and driven elements, as the shafts 1— and —2— are journaled end to end upon a common axis in a suitable case —A— which incloses the gears —3—, —4—, —5— and —6— and protects the latter from the accumulation of dust and other foreign matter.

The driven shaft —2— and gear —3— are locked together by suitable keys or pins —7— so that both rotate together at the same speed, the internal gear—3— being concentric with the axis of both shafts —1— and —2—.

The driving shaft —1— is in this instance, loosely stepped in a suitable bearing —8— in one end of a shaft —2— to afford additional support for maintaining the meeting ends of the driving and driven shafts in axial alinement with each other.

Rigidly secured to the inner end of the driving shaft —1— is a crank-arm —9— composed of longitudinal sections adjustable lengthwise of each other to permit the take-up of the wear between the planetary gears 5 and 6 and those with which they mesh, the adjustable section of the crank-arm being held in its adjusted position by suitable locking means, as a set screw —10—.

The outer end of the crank-arm —9— is provided with a rigid stud or spindle —11— parallel with the shafts —1— and —2—, and upon which is journaled the planetary gear —5— so as to travel around the shaft —1— in mesh with the fixed gear —4— as said shaft is rotated by any available power, not necessary to herein illustrate or describe.

The stud or spindle —11— is provided with a crank-arm carrying an eccentric journal or spindle —12—, which is also parallel with the axis of the shafts —1— and —2—, and upon which is journaled the planetary gear —6—.

The spindle —12— is rigid with the stud or spindle —11— and is offset a greater or less distance in a radial line or plane extending from the axis of the shafts —1— and —2— through the axis of the spindle —11— to the contact points of the pitch-lines of the intermeshing gears.

The gears —3— and —4— are of substantially the same pitch diameter and the planetary gear —6— which meshes with the gear —3— in the same radial plane as that of the gear —5— with the fixed gear —4— is, therefore, of less diameter than the planetary gear —5—, according to the degree of offset of its spindle —12— from the axis of the spindle —11—.

It is now obvious that as the driving shaft —1— is rotated, as for instance, in the direction indicated by arrow —x—, Fig. 1, the planetary gears —5— and —6— are carried bodily around the axis of the shafts —1— and —2— in different concentric deferents, causing the gear —5— which meshes with the fixed gear —4— to rotate in the direction indicated by arrow —y—, Fig. 1, upon its supporting spindle —11—.

The planetary gears —5— and —6— are eccentrically connected for simultaneous rotation by a series of, in this instance, four crank-spindles —13— and —14— which are journaled in apertures or bearings in their respective gears —5— and —6—, thereby locking said planet gears against independent rotation, and at the same time permitting them to revolve freely, each upon its own axis.

The spindles 13— are arranged concentrically around the central spindle —11— a uniform distance apart, and the spindles —14— are similarly arranged around the central spindle 12—, but are offset from the spindles 13— in the same direction, and at the same distance as the crank 12— from its spindle —11—.

The radial offset of the spindle —12— from the spindle —11— is equal to the difference in radii between the gears —5— and —6—, and serve to keep the planet gear —6— in mesh with its gear —3— in the same radial plane as that of the gear —5— with the fixed gear —4— during its orbital travel. In other words, the axes of the planet gears —5— and —6— travel in different concentric deferents or orbital paths, and their radii vectors are, therefore, constant, but of unequal length. During such planetary movement positive rotary motion is imparted by the fixed gear —4— to the planetary gear —5— causing both planetary gears to rotate in the direction indicated by arrow —y— or opposite to that of the planetary action, the connecting spindles —13— and —14— serving to transmit such rotary motion from the planet gear —5— to the gear —6—. For example, in Fig. 3 I have shown the pitch lines of the gears —3— and —6— in full lines, and the pitch lines of the gears —4— and —5— in dotted lines with the planetary gears in different positions to illustrate the degree of movement transmitted to the large gear —3— by a certain degree of orbital movement of the planet gears —5— and 6—.

For convenience of description; assuming that the pitch diameters of the gears —3— and —4— are equal, to say, 6 units, as inches, while those of the planet gears —5— and —6— are 2 units and 1½ units respectively: Now, by designating the crank spindles 13— and 14—, as —a—, —b—, —c— and —d—, let it be assumed that the orbital movement of the planet gears starts at —m— to move in the direction indicated by arrow —X—, then one-third of the orbital movement of the planetary gear —5— will have caused the latter to make one complete revolution upon its spindle —11—, and in like manner, the eccentric connections —a—, —b—, —c— and —d— will have caused the planetary gear —6— to have also made one complete revolution so that the same point of contact of the pitch lines of the planet gears —5— and 6— will, upon one complete rotation, be shifted one-third of the pitch-line circle of the gears —3— and 4. During this orbital movement of the planet gears the latter are rotated upon their axes in the opposite direction indicated by arrow —y—, and owing to the fact that the smaller planet gear —6— has traveled through one-third of the deferent, or in this instance, about 6.28 units, measured on the pitch circle of the large gear —3—, but is rotated backward one complete revolution, in this instance, 4.71 units, it will have advanced or rotated the large gear —3— the difference between its orbital movement and its degree of backward rotation upon its axis, which amounts in this instance, to about 1.57 units. The other two positions of the planet gears shown in Fig. 3, indicate the different positions which the eccentric spindles —a—, —b—, —c—, and —d— assume during the orbital travel of said planet gears. This rotation of the planetary gear —5— imparts similar motion in the same direction, but at a different speed to the planetary gear —6— upon its spindle 12—. Owing to the fact that the spindle 12— upon which the gear —6 is journaled is always in the same radial plane with the axis of the spindle —11—, the gear —6— is always held in mesh with the teeth of the rotary gear —3— so that while it is being carried bodily around the axis of the driving shaft —1— it is being rotated in the opposite direction upon its spindle 12— by the rotation of the gear —5—, but inasmuch as the contact point of its pitch-line advances faster by the continual advance of its supporting spindle, it imparts rotary motion to the gear —3— at a speed equal to the difference between its advancing movement around the axis of the shaft —1— and its backward movement caused by its interlocking connections, as the spindles —13— with the gear —5—. This rotary movement of the gear —3— is imparted to the driven shaft —2—, which may be connected in any one of the devices hereinbefore specified. Owing to the fact that the planetary gears —5— and —6— are locked to each other, and that the gear —5— meshes with, and is, therefore, locked to the fixed gear —4—, it is evident that any retrograde action of the driven element, as the gear —3—, will be prevented. In other words, the load upon the driven shaft —2— or element —3— is automatically locked in its adjusted position through the intermeshing connection of the gear —3— with the planetary gear —6—.

In order that the planetary gears —5— and —6— and their supporting-crank-arm —9— may be counterbalanced, I preferably duplicate said parts on the diametrically opposite side of the axis of the driving element, as best seen in Figs. 1 and 2.

In Figs. 4 and 5 I have shown a mechanism similar to that just described except that the spur gears —20— and 21— are substituted for the internal gears —3— and —4—, otherwise, the planetary gears and their connections with the driving element are substantially the same as shown in Figs. 1 and 2.

In Figs. 6 and 7, the internal gears —3— and —4— are substituted by a revoluble pulley —30— and a fixed pulley —31—, both mounted upon the same axis, the revoluble pulley —30— being rigidly connected to a driven pulley —32—, also upon the same axis. In this case the pulleys —30— and 31— are connected by belts —33— and —34— to planetary pulleys —35— and —36— which are mounted upon eccentric spindles —37— and —38—, both of which are rigid with a revolving driving element, as a crank-arm —39— which may be driven by any available power through the medium of a belt —40— and pulley —41—. The planetary gears —35— and —36— are flexibly locked together by belts —42— each connecting a pair of studs —43— which are spaced apart a distance corresponding to the radial distance between the centers of the spindles —37— and —38—, each pair of studs —43— and its connecting belt —42— serving as a substitute for the crank-spindles 13— and 14— of the device seen in Figs. 1 and 2. In this latter device, as the element —39— is rotated rotary motion is imparted by the belt —34— from the fixed pulley —31—to the pulley —36—, which rotation through the medium of the connecting belts —42— causes similar rotation in the same direction of the planetary pulley —35— upon its axis —37— during the planetary movement of both pulleys —35— and —36— around the axis of the driving element —39—.

What I claim is:

1. In a power transmitting mechanism, an epicyclic train having two separately revoluble planetary wheels traveling in different concentric deferents, one deriving rotary motion from the other.

2. In a power transmitting mechanism, two planetary wheels revolving on different axes, and connected for simultaneous rotation.

3. In a power transmitting mechanism, an epicyclic train having two separately revoluble planetary wheels traveling in different concentric deferents and connected for simultaneous rotation in the same direction.

4. In a power transmitting mechanism, an epicyclic train having two planet wheels mounted on axes at different distances from the axis of the deferents in which they travel, one planet wheel being eccentrically connected to the other.

5. In a power transmitting mechanism, a fixed annulus, a planet wheel moving about the annulus and deriving motion therefrom, means for moving the planet wheel around its deferent, and a second planet wheel connected to and moving with the first named planet wheel, but revolving on a different axis.

6. In a power transmitting mechanism, a fixed annulus, a planet wheel deriving rotary motion from said annulus, means for moving the planet wheel through its deferent, a second planet wheel eccentrically connected to and deriving rotary motion from the first named planet wheel, and a rotary element actuated by the second planet wheel.

7. In a power transmitting mechanism, a fixed annulus, and a rotary annulus both having a common axis, planet wheels, means for moving them around their respective deferents, one of said planet wheels deriving motion from the fixed annulus, and the other receiving rotary motion from the last named planet wheel and transmitting rotary motion to the rotary annulus, said planet wheels revolving on different axes at different radial distances from the axis of the annuli.

8. In a power transmitting mechanism, a fixed annulus and a rotary annulus, both having a common axis, planet wheels flexibly locked together for simultaneous rotation through their respective deferents, one of said planet gears being actuated by the fixed annulus, and the other planet gear actuating the rotary annulus.

9. In a power transmitting mechanism, a fixed annulus and a rotary annulus both having a common axis, a planet wheel deriving rotary motion from the fixed annulus, means for moving said planet wheel through its deferent, a second planet wheel eccentrically connected to and deriving rotary motion from the first named planet wheel and actuating the rotary annulus, said planet wheels moving in different concentric deferents.

10. In a power transmitting mechanism, a fixed annulus and a rotary annulus, both of the same diameter and having a common axis, a planet wheel deriving rotary motion from the fixed annulus during its rotation through its deferent, means to carry the planet wheel through its orbit, a second planet wheel flexibly connected to and deriving rotary motion from the first planet wheel, and transmitting rotary motion to the rotary annulus.

In witness whereof I have hereunto set my hand this 20th day of June, 1904.

BENNETT VAN DECAR.

Witnesses:
  H. E. CHASE,
  MILDRED M. NOTT.